July 21, 1925.
B. D. SMITH
TRAP
Filed April 5, 1924
1,546,515
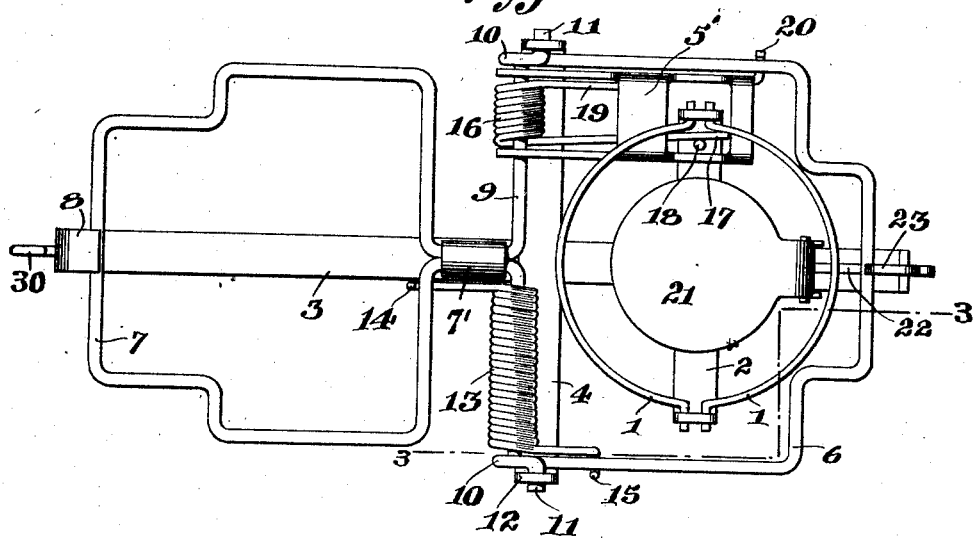
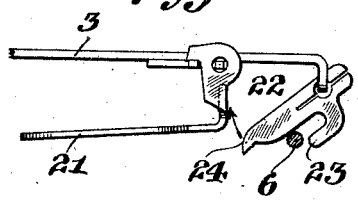
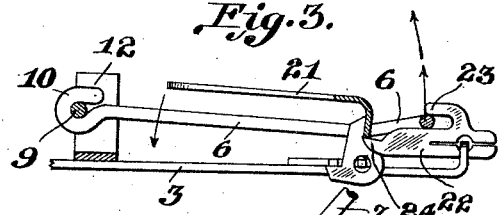
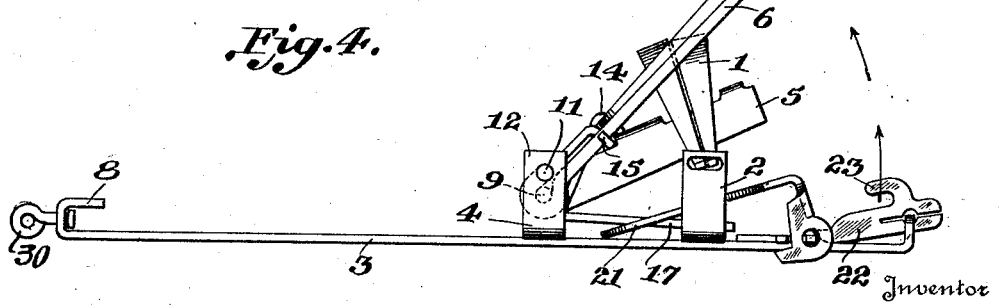
Inventor
Blanchard D. Smith
By Mason Fenwick & Lawrence,
Attorneys Patented July 21, 1925.

1,546,515

UNITED STATES PATENT OFFICE.

BLANCHARD D. SMITH, OF NEW ORLEANS, LOUISIANA.

TRAP.

Application filed April 5, 1924. Serial No. 704,447.

*To all whom it may concern:*

Be it known that I, BLANCHARD D. SMITH, a citizen of the United States, residing at New Orleans, in the parish of Orleans and State of Louisiana, have invented certain new and useful Improvements in Traps, of which the following is a specification.

This invention relates to animal traps of the type employing two sets of jaws or traps, primary and secondary, the primary first grasping the feet of the animal and the secondary firmly holding the animal to prevent it from wrenching its foot off and escaping. Traps of this type are usually dangerous to set as by their nature they necessitate the complete setting and latching of two sets of jaws, and as heretofore constructed it has been the practice to set one in open and catching position prior to the setting of the other.

The object of this invention is to eliminate this danger to the trapper by setting both sets of jaws simultaneously and automatically, thereby keeping his hands away from the open or set jaws, and more particularly away from the primary which are usually powerful in their closing action. Also the simultaneous setting of both sets effected by the action of bringing the larger secondary jaws to their ultimate open position eliminates much time and energy for the trapper in his daily rounds.

In the drawings, Fig. 1 is a plan view of the invention showing the respective traps in open or set position.

Fig. 2 is a side elevation of a portion of the trap showing the same upside down to illustrate the manner of effecting latching of the treadle by the swinging action of one of the secondary jaws and through the action of gravity on the treadle and its latch, the jaw which contacts with the latch being shown in section taken on line 3—3 of Fig. 1.

Fig. 3 is a fragmentary vertical section showing the treadle and one jaw in set position.

Fig. 4 is a side elevation of the trap in closed position after it has been sprung.

Referring to the drawings, numeral 1 indicates the two jaws of the primary trap, the terminals of the jaws being turnably mounted in upstanding supports at the ends of a bar 2 which is affixed to and extends across a bar 3 forming the main base of the trap.

Affixed to said bar 3 in spaced parallel relation to bar 2 is a bar 4 which forms the pivotal base for three members of the trap, namely, the spring-actuated lever 5 which acts as explained hereafter to close the primary jaws 1, a secondary jaw 6 which in its opening and closing movements coacts with said lever 5, and another secondary jaw 7 adapted to interlock with an inwardly extending hook 8 at one end of the bar 3.

The jaw 7 is constructed in a manner to provide a shaft 9 which in the present showing extends parallel with the loop of the jaw which engages under the hook 8 on the end of bar 3. In the present instance the jaw is shown as made from a bar bent into the desired shape, the shaft 9 of the jaw being formed by the oppositely directed terminals of the bar, there being a clip or collar 7' disposed about two contiguous parts of the bar to more firmly hold the shaft portions in position. This particular construction, however, is optional and merely illustrates one manner of making the jaw.

The terminals of the shaft 9 have bearing in eyes 10 formed at the ends of the jaw 6. These eyes have laterally extending stub shafts 11 arranged eccentric with respect to the center of the eyes and are seated in upstanding supports 12 at the ends of the bar 4. A coil spring 13 telescopes one end of the jaw shaft 9 and has one of its terminals 14 underlying the jaw 7 at a point removed from its shaft and has its other terminal 15 underlying the adjacent arm of the jaw 6 at a point removed from its stub shaft. The spring is so tensioned as to normally hold the jaws 6 and 7 in closed position as indicated in Fig. 4.

At this point it may be mentioned that both of the jaws 6 and 7, when closed upon each other, by the spring 13, may be swung as a unit on the axis of the jaw 6 toward and from the base bar 3 without any opposition being offered thereto by said spring 13. This is an important feature of the invention for reasons hereinafter more fully set forth.

A second coil spring 16 is telescoped over the shaft 9, and one terminal 17 of the same reacts against the bar 2 adjacent a pin or lug 18 rising from the bar. The other terminal 19 is disposed below a bridge 5′ intermediate the ends of the lever 5 and tends to wing the lever upwardly to close the primary jaws 1. The lever 5 is mounted on the shaft 9, the spring 16 being disposed between the arms constituting the lever and has a lateral extension or finger 20 extending across the path of movement of the adjacent side arm of the jaw 6, and hence is adapted to be engaged and carried down by the jaw 6 as the latter is swung clockwise as viewed in the drawings.

Mounted on the bar 3 is a treadle 21 and on the adjacent end of the said bar is mounted a latch 22 adapted to impositively lock the treadle in set position as will be readily understood by reference to Fig. 3. The latch has a finger 23 which is adapted to extend over the loop of the jaw 6 when the trap is set and also has a rounded heel 24 at its treadle engaging end to permit the latch to readily swing the treadle aside when the trap is held upside down preparatory to setting the same as will be readily understood by reference to Fig. 2.

The manner of setting the trap will now be described. The trapper turns the trap upside down and swings the jaws 6 and 7 as a unit away from the primary trap until the jaw 7 strikes the bar 3 immediately in front of the hook 8. The trapper then holds the jaw 7 against the bar 3 and grasping the jaw 6 swings it into contact with the latch 22 contact being made in front of the end of the finger 23 thereon, as clearly shown in Fig. 2. The latch will then be swung by the jaw 6 into latching engagement with the treadle 21, the latter moving upwardly against the action of gravity as the heel 24 of the latch wipes the same. The loop of the jaw 6 enters space between the body of the latch and the finger 23 thereon as the latch is swung into final position as will be readily understood. The loop of the jaw 7 has at the same time been shifted under the hook 8 at the end of the bar 3. This occurs by reason of the fact that the jaw 7 has its shaft 9 mounted in the eyes 10 at the terminal ends of the jaw 6, which eyes are eccentric to the stub shafts 11 of the said jaw 6. The jaw 6 in being swung into engagement with the latch 22 engages the lever 5 by reason of the finger 20 thereon lying in the path of the jaw 6 and forces the lever against the tension of its spring 16 to a point below the adjacent pivot of the primary jaws 1, thus opening the jaws 1.

When the animal steps on the treadle 21, the latch 22 flies up because of the upward pressure thereon by jaw 6 which it will be recalled is acted upon by the spring 13. The lever 5 acted on by the spring 16 follows the upward movement of the said jaw and closes the primary jaws before the jaw 6 swings over the primary jaws. As the jaw 6 continues to swing it shifts the loop of the jaw 7 away from the hook 8 whereon the jaw 7 instantly swings up toward the jaw 6, jaws 6 and 7 thus closing about the animal at a point above the highest point of the primary trap or jaws 1.

It will now be apparent that the arrangement of the trap is such that the jaw 7 is held by the hook 8 until the jaw 6 has swung clear of the lever 5 allowing the latter to close the primary jaws 1; that the jaw 6 has not swung over the primary trap at the time the jaw 7 is released; that the jaw 7 after release swings up to meet the jaw 6; that the spring 13 between the jaws 6 and 7 acts independently of the lever operating spring 16; that the jaws 6 and 7 are freely swingable together on the stub shafts 11 of the jaw 6; and that the trap as a whole is set by the simple operation of opening the jaws 6 and 7 and swinging the jaw 6 against the latch 22 while holding the jaw 7 against the bar 3, the trap being preferably held in inverted position so as to allow gravity to act on the treadle and its latch 22. By taking advantage of gravity instead of springs to hold the treadle and its latch in position to permit interlocking of these parts, when the heel of the latch is swung against the treadle, considerable saving is effected in the manufacture of the trap as will be readily appreciated. If springs were provided in connection with the treadle and latch the trap could be of course set without turning it over, but no other advantage would be gained.

Due to prior inventions in traps employing primary and secondary jaws or traps it is desirable to clearly define the action of the secondary trap or jaws in the invention herein described. Due to the spring 13 being long and employing many turns, its action is more to firmly squeeze the body of the animal rather than to strike it or drag the body away from the primary trap or jaws and its natural tendency is to firmly hold the animal directly above the closed primary jaws. By the time that the secondary jaw 6 becomes removed from the lever 5, it has caused the release of the other secondary jaw 7, and after striking the body of the animal above the primary trap presses against the animal awaiting the final closing of the ssociated jaw 7. Therefore the action of jaw 6 is not to pass on over the primary trap and drag the body with it, but due to its spring action being entirely dependent upon the other movable jaw 7 will readily lie in the position shown in Fig. 4 with the jaw 7 firmly pressing against the other side of the animal's body. In other words, when the two secondary jaws have firmly grasped the body they have no tendency due to spring action or otherwise to move in any given direction but only to grasp the animal.

It will be noted that jaw 7 in its closing movement will rotate over ninety degrees to grasp the animal due solely to the fact that the pivotal axis of the secondary jaws, though parallel to the axis of the primary jaws, is removed therefrom to permit the use of a lever 5 of sufficient length to close the primary jaws and whose pivotal axis approximates the pivotal axes of the secondary jaws, this displacement being used solely for this purpose. It is understood that prior inventions using a secondary jaw which rotates over ninety degrees are of that class wherein the secondary jaws have a pivotal axis at an angle to the axis of the primary jaws and also wherein the secondary jaw passes over the primary jaws whereas the invention herein described is of that type exemplified in Patent 616,172 using two sets of jaws with parallel axes, except that a departure is herein made by removing the axes of the primary jaws from the pivotal axes of the secondary jaws an appreciable desired distance to secure the automatic setting under this simple construction.

To more firmly grasp the animal and prevent its squirming from the grip of the secondary jaws, one of the said jaws may be bent at an angle adjacent its loop as shown in Fig. 4, one jaw also preferably being longer than the other to form a beak.

For securing the trap on the ground or any suitable support there may be provided an eye-link 30 secured to the base 3 at any convenient point, as shown.

It now being apparent that this invention provides a trap with several novel features, it is to be understood that the scope of the invention is to be defined by the appended claims.

What I claim is:

1. The combination with a primary trap having a spring actuated lever for closing the same, of a secondary trap comprising a pair of jaws having their turning axes in spaced relation to the turning axis of the primary trap, both jaws of the secondary trap being freely swingable as a unit without interference from the primary trap from a point overlying the latter to a point at one side of the same, and means for impositively holding the primary and secondary traps in open position when one of the jaws of the secondary trap is disposed adjacent the swinging axis of the primary trap.

2. The combination with a primary trap having a spring actuated lever for closing the same, of a secondary trap comprising a pair of jaws swingable on axes in spaced relation to the turning axis of the primary trap, both jaws of the secondary trap being freely swingable as a unit from a point determined by the said lever to a point at one side of the same, a treadle and a latch therefor, means on said latch for impositively holding one of the jaws of the secondary trap when the primary trap is in open position, means for holding the other jaw of the secondary trap in open position during the time the other jaw is held impositively locked, and means causing the said lever to open the primary trap as one of the said jaws is swung into position for impositive locking with said latch.

3. The combination with a primary trap having means for closing the same, of a secondary trap comprising a pair of jaws swingable on axes in spaced relation to the turning axis of the primary trap, both jaws of the secondary trap being freely swingable as a unit from a point determined by the said lever to a point at one side of the same, a treadle and a latch therefor, means on said latch for impositively holding one of the jaws of the secondary trap when the primary trap is in open position, means for holding the other jaw of the secondary trap in open position during the time the other jaw is held impositively locked, and means for opening the primary trap as one of the said jaws is swung in position for impositive locking with said latch.

4. The combination with a primary trap having a spring actuated lever for closing the same, of a secondary trap comprising a pair of jaws one of which is of a width to embrace the primary trap and which has stub shafts at its terminals and also shaft receiving bearings eccentrically disposed adjacent said stub shafts, the other jaw having a shaft whose terminals are received in said bearings, a spring acting on said jaws to close the same, a treadle and a latch therefor, said latch having means for impositively holding that jaw which is adapted to embrace the primary trap, and means for holding the other jaw in open position when the said latch holds the first-named jaw, said lever extending into the path of the latch-held jaw and adapted to be swung to fully tensioned position by the same when the latter is swung into engagement with the latch.

5. The combination with a primary trap having means for closing the same, of a secondary trap comprising a pair of jaws one of which is of a width to embrace the primary trap and which has stub shafts at its terminals and also shaft receiving bearings eccentrically disposed adjacent said stub shafts, the other jaw having a shaft whose terminals are received in said bearings, a spring acting on said jaws to close the same, a treadle and a latch therefor, said latch having means for impositively holding that jaw which is adapted to embrace the primary trap, means for holding the other jaw in open position when the said latch holds the first-named jaw, and means extending in the path of that jaw which is adapted to be held by said latch whereby the jaw when swung in cooperative engagement with said latch will open the primary trap.

6. The combination specified in claim 4, that portion of said lever extending into the path of the said jaw having a finger above which said jaw is positioned as it swings into latch engaging position.

7. The combination specified in claim 4, said lever being pivotally mounted on that shaft which is supported by the said eccentrically arranged bearings.

8. The combination specified in claim 4, the spring for closing said jaws being mounted on the shaft on one of the jaws.

9. The combination specified in claim 4, the said spring actuated lever being actuated by a spring mounted on that shaft which is supported by the said eccentrically arranged bearings.

10. In a trap, the combination of a pair of bail-like jaws eccentrically mounted with respect to each other, a spring supported by said jaws and tending to close them upon each other, a second pair of jaws, a spring-actuated lever carried by the first-named jaws and tending to close the second-named jaws upon each other, means for holding each of the first-named jaws in open position and constituting for one of the jaws a treadle-controlled latch, and means controlled by the last-named jaw for opening the second pair of jaws as the jaw is swung into cooperative engagement with the treadle-controlled latch.

11. In combination, a pair of bail-like jaws one of which is mounted to swing in bearings in the other jaw, the latter being mounted to swing in a support on stub shafts arranged eccentrically to the axis of the said bearings, a lever mounted on one jaw on an axis coincident with the axis of said bearings, a coil spring mounted on the said one jaw for swinging said lever in one direction, a hook fixed with respect to said support and beneath which the loop of the said one jaw is adapted to be received when the jaws are in open position, a treadle and a latch therefor, said latch having a hooked finger beneath which the other jaw is adapted to be received when the jaws are in open position, a finger on the said lever above which the last named jaw is adapted to be received when the jaws are in open position, and a pair of primary jaws disposed on an axis lying between the said latch and the axes of the other jaws, said lever adapted to close the primary jaws when the treadle is sprung.

12. The combination of a trap comprising two sets of jaws, primary and secondary, each set having pivotal axes parallel to each other, a spring-actuated lever pivoted near the pivotal axes of the secondary jaws said axes being displaced laterally relative to a common base sufficiently to allow said lever to operate to close the primary jaws around their pivotal axis, and a treadle to releasably hold said jaws in open position.

13. The combination specified in claim 12, and means provided to effect the automatic locking of both sets of jaws in open position, said means including a treadle, a finger adapted to releasably engage said treadle, and means for automatically locking one of said secondary jaws beneath said finger.

14. The combination specified in claim 12, said spring-actuated lever adapted to be engaged by one of said secondary jaws in its opening movement.

15. The combination of a trap comprising two sets of jaws, primary and secondary, each set having pivotal axes parallel to each other, a spring-actuated lever pivoted near the pivotal axes of the secondary jaws, said axes being displaced laterally relative to a common base sufficiently to allow said lever to operate to close the primary jaws around their pivotal axes, a treadle to releasably hold said jaws in open position, said spring-actuated lever adapted to be engaged by one of said secondary jaws in its opening movement and become interlocked therewith in their partial opening and closing movements.

16. The combination of a trap comprising two sets of jaws, primary and secondary, each set having pivotal axes parallel to each other, a spring-actuated lever pivoted near the pivotal axes of the secondary jaws, said axes being displaced laterally relative to a common base sufficiently to allow said lever to operate to close the primary jaws around their pivotal axes, a treadle to releasably hold said jaws in open position, and means provided to effect the automatic locking of both sets of jaws in open position, said means including a treadle, a finger adapted to releasably engage said treadle, and means for automatically locking one of said secondary jaws beneath said finger, said secondary jaw having shiftable means with the other secondary jaw to effect its release from tensioned position.

17. The combination of a trap comprising two sets of jaws, primary and secondary, one of said secondary jaws having a transverse pivotal extension and a coil spring adapted to encircle said extension.

18. The combination specified in claim 17, and two tangential extensions on said spring to engage respectively the two secondary jaws.

19. The combination of a trap comprising two sets of jaws, primary and secondary, one of said secondary jaws being suitably pivoted and providing an eccentric bearing for the pivotal axis of the other secondary jaw.

In testimony whereof, I affix my signature.

BLANCHARD D. SMITH.

Witnesses:
CARL SUTTER,
FRED S. MARTIN.